(12) United States Patent
Shimamura

(10) Patent No.: US 8,510,670 B2
(45) Date of Patent: Aug. 13, 2013

(54) INFORMATION PROCESSING APPARATUS, INFORMATION PROCESSING METHOD THEREOF, AND COMPUTER-READABLE STORAGE MEDIUM

(75) Inventor: Yoshiyuki Shimamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 12/980,673

(22) Filed: Dec. 29, 2010

(65) Prior Publication Data

US 2011/0169753 A1  Jul. 14, 2011

(30) Foreign Application Priority Data

Jan. 12, 2010  (JP) ................................ 2010-004442

(51) Int. Cl.
*G06F 3/041*  (2006.01)

(52) U.S. Cl.
USPC ............................ 715/769; 715/702; 715/862

(58) Field of Classification Search
USPC .......................... 715/769, 702, 863, 862, 865
See application file for complete search history.

(56) References Cited

U.S. PATENT DOCUMENTS

| | | | | |
|---|---|---|---|---|
| 7,551,184 B2 * | 6/2009 | Shimizu | ........................ | 345/629 |
| 7,856,605 B2 * | 12/2010 | Ording et al. | ................. | 715/856 |
| 8,248,365 B2 * | 8/2012 | Baudisch et al. | ............. | 345/157 |
| 2006/0244735 A1 * | 11/2006 | Wilson | ........................ | 345/173 |
| 2007/0030293 A1 * | 2/2007 | Shimizu | ........................ | 345/668 |
| 2007/0192731 A1 * | 8/2007 | Townsend et al. | ............. | 715/788 |
| 2007/0198953 A1 * | 8/2007 | Baudisch et al. | ............. | 715/856 |
| 2007/0200713 A1 * | 8/2007 | Weber et al. | ................ | 340/573.1 |
| 2007/0291007 A1 * | 12/2007 | Forlines et al. | ................ | 345/173 |
| 2008/0259040 A1 * | 10/2008 | Ording et al. | .................. | 345/173 |
| 2009/0002326 A1 * | 1/2009 | Pihlaja | ........................... | 345/173 |
| 2009/0002332 A1 * | 1/2009 | Park et al. | ...................... | 345/173 |
| 2009/0158149 A1 * | 6/2009 | Ko | ................................ | 715/702 |
| 2010/0079405 A1 * | 4/2010 | Bernstein | ...................... | 345/174 |
| 2010/0088632 A1 * | 4/2010 | Knowles et al. | .............. | 715/784 |
| 2010/0141680 A1 * | 6/2010 | Nashida et al. | ............... | 345/642 |
| 2011/0141142 A1 * | 6/2011 | Leffert et al. | .................. | 345/659 |

FOREIGN PATENT DOCUMENTS

JP  6-051908 A  2/1994

* cited by examiner

*Primary Examiner* — Daeho Song
(74) *Attorney, Agent, or Firm* — Fitzpatrick, Cella, Harper & Scinto

(57) ABSTRACT

An information processing apparatus inputs instructed coordinates to a display screen, and selects an object displayed at a coordinate position that corresponds to the input coordinates. When a drag operation for the object that was selected by the selection unit has been detected, a determination is made of whether or not the distance between the coordinate position of the selected object and input coordinates after the drag operation was detected exceeds a predetermined distance. If that distance does not exceed the predetermined distance, a moving amount of the object is made less than a moving amount of the drag operation, or the selected object is not moved.

17 Claims, 11 Drawing Sheets

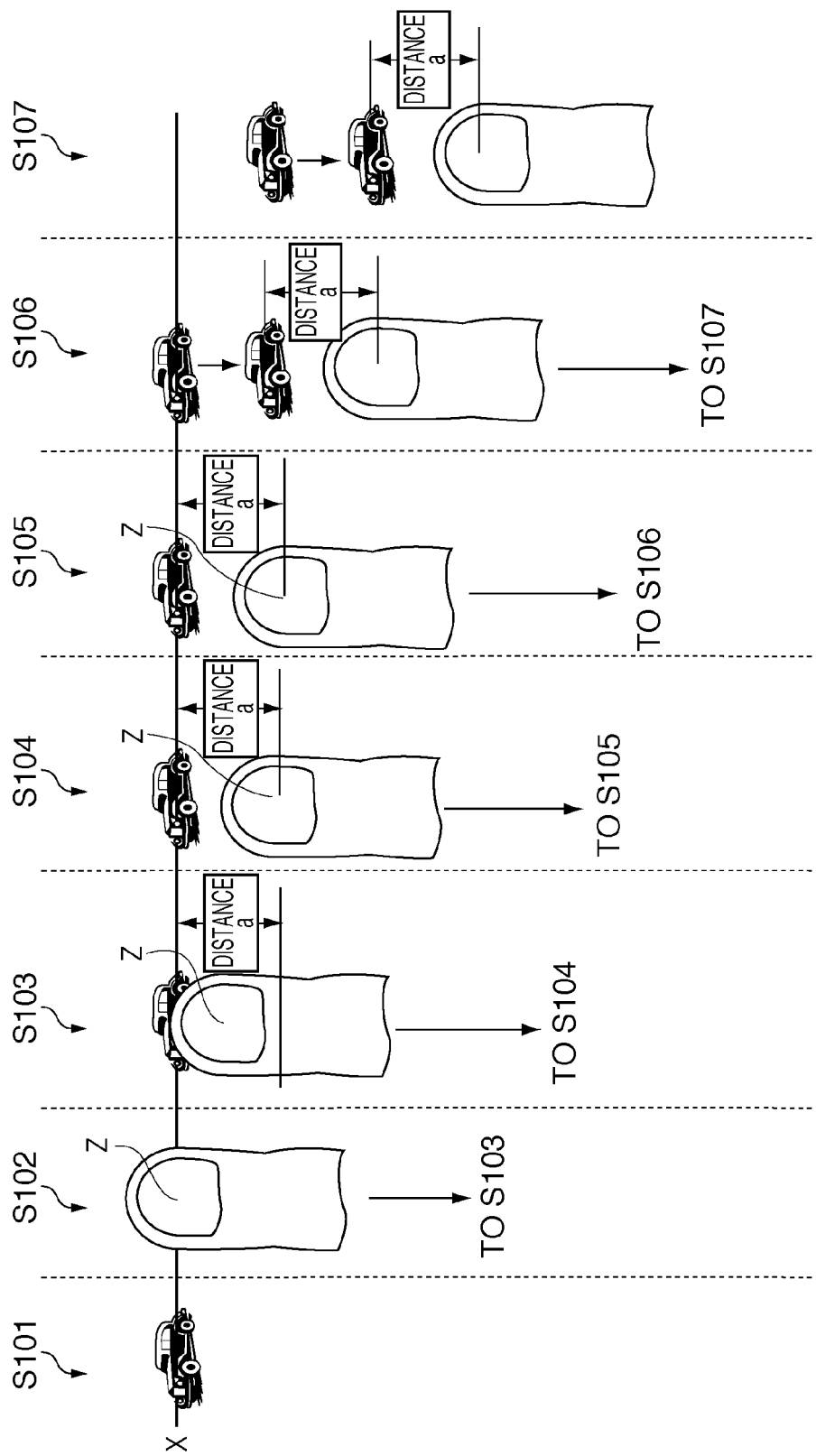

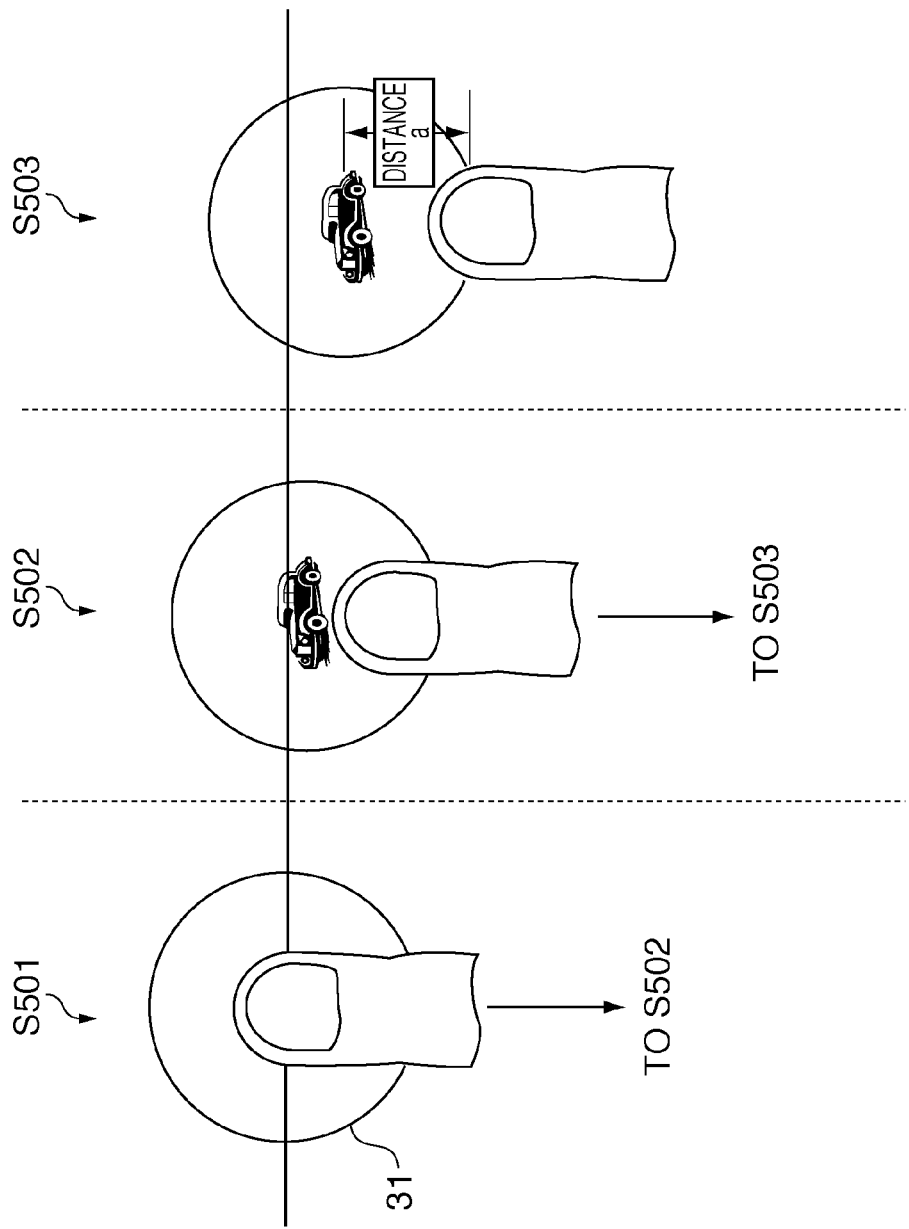

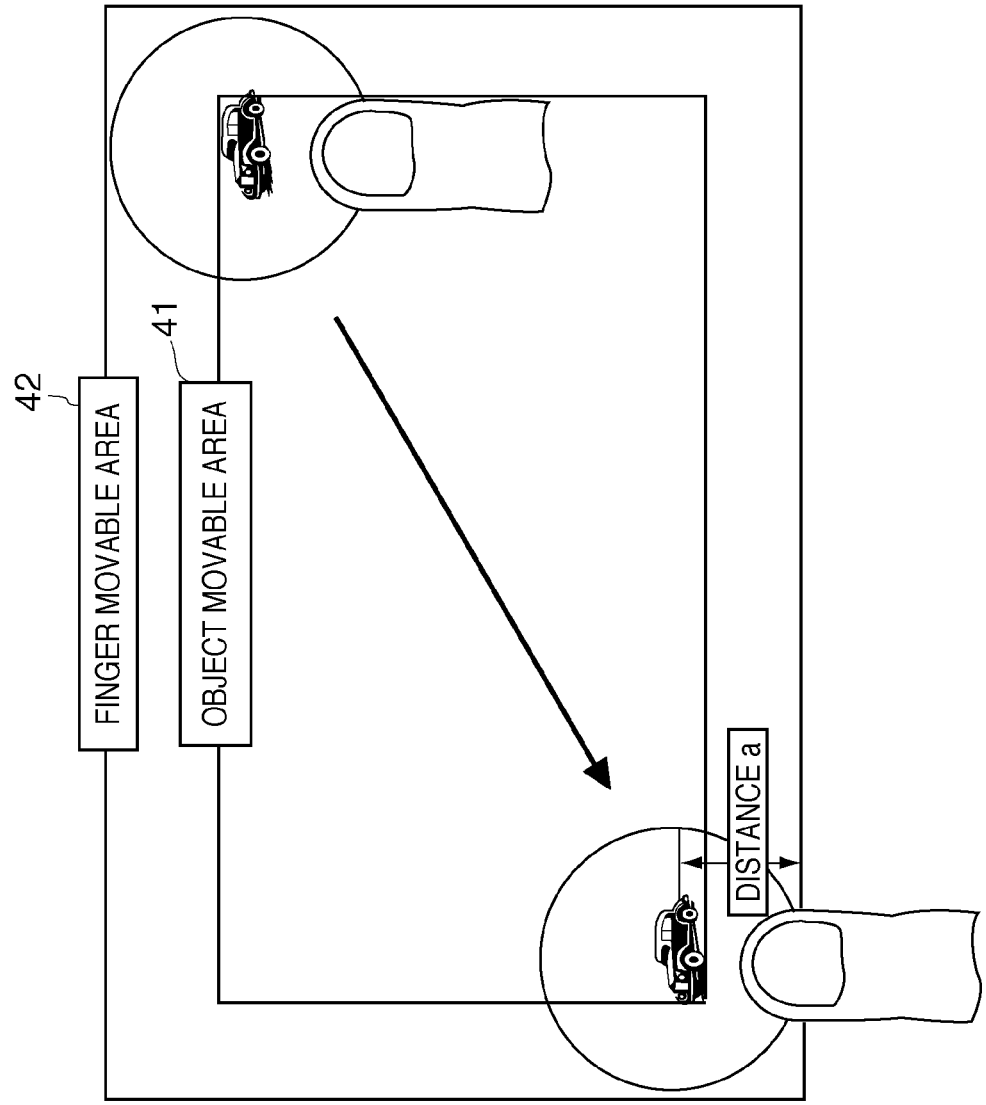

INFORMATION PROCESSING APPARATUS, INFORMATION PROCESSING METHOD THEREOF, AND COMPUTER-READABLE STORAGE MEDIUM

BACKGROUND OF THE INVENTION

1. Field of the Invention

The present invention relates to an information processing apparatus, an information processing method thereof, and a computer-readable storage medium.

2. Description of the Related Art

Conventionally, an information processing apparatus is known that receives input from a coordinate input apparatus (such as a touch panel). In this sort of information processing apparatus, when a user touches a target item (object) in a display screen with a finger or an instructing body (for example, a pen), that object is selected, and the object moves following movement of the finger or the like. However, in this case, if the object is small, the finger may unintentionally hide the object.

Consequently, for example, Japanese Patent Laid-Open No. 06-051908 discloses technology whereby, such that a finger does not hide an object, a cursor is displayed shifted by a predetermined distance from a touched position, and the object displayed at the position of the cursor is selected and moved.

With the technology described in Japanese Patent Laid-Open No. 06-051908, the cursor is displayed at a position shifted from the position of the finger, so it is necessary for the user to perform an object moving operation after matching the position of the cursor to the object. That is, when moving the object by a drag operation, the user must first move the cursor to the position where the object is displayed, and then confirm selection of the object. Therefore, operation is more complicated than in a method in which the object itself is touched to select the object.

SUMMARY OF THE INVENTION

The present invention provides technology whereby operability is improved when moving a small object using coordinate input.

According to a first aspect of the present invention, there is provided an information processing apparatus, comprising: an input unit configured to input coordinates in a display screen where an object is being displayed according to an instruction by a user; a selection unit configured to select the object being displayed in the display screen, corresponding to the input coordinates that were input by the input unit; a determination unit configured to, based on the input coordinates that were input by the input unit, detect a drag operation performed by the user in order to move the object that was selected by the selection unit, and determine a distance between a position where the object that was selected by the selection unit is being displayed in the display screen and a position that has been designated by the detected drag operation; and a moving control unit configured to, when the distance that was determined by the determination unit exceeds a predetermined distance, perform control so as to cause the object that was selected by the selection unit to move following the drag operation, and when the distance that was determined by the determination unit does not exceed the predetermined distance, perform control so as to cause the object to move such that a moving amount of the object is less than a moving amount of the drag operation, or so as to not cause the object to move.

According to a second aspect of the present invention, there is provided an information processing method, comprising: inputting coordinates in a display screen where an object is being displayed according to an instruction by a user; selecting the object being displayed in the display screen, corresponding to the input coordinates that were input in the input step; detecting, based on the input coordinates that were input in the input step, a drag operation performed by the user in order to move the object that was selected in the selection step, and determining a distance between a position where the object that was selected in the selection step is being displayed in the display screen and a position that has been designated by the detected drag operation; and performing moving control so as to, when the distance that was determined in the determination step exceeds a predetermined distance, cause the object that was selected in the selection step to move following the drag operation, and when the distance that was determined in the determination step does not exceed the predetermined distance, cause the object to move such that a moving amount of the object is less than a moving amount of the drag operation, or so as to not cause the selected object to move.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 shows an example summary of processing in the information processing apparatus 10 shown in FIGS. 1A and 1B, and FIG. 2.

FIG. 10 shows an example of a modified embodiment.
FIG. 11 shows an example of a modified embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1A:
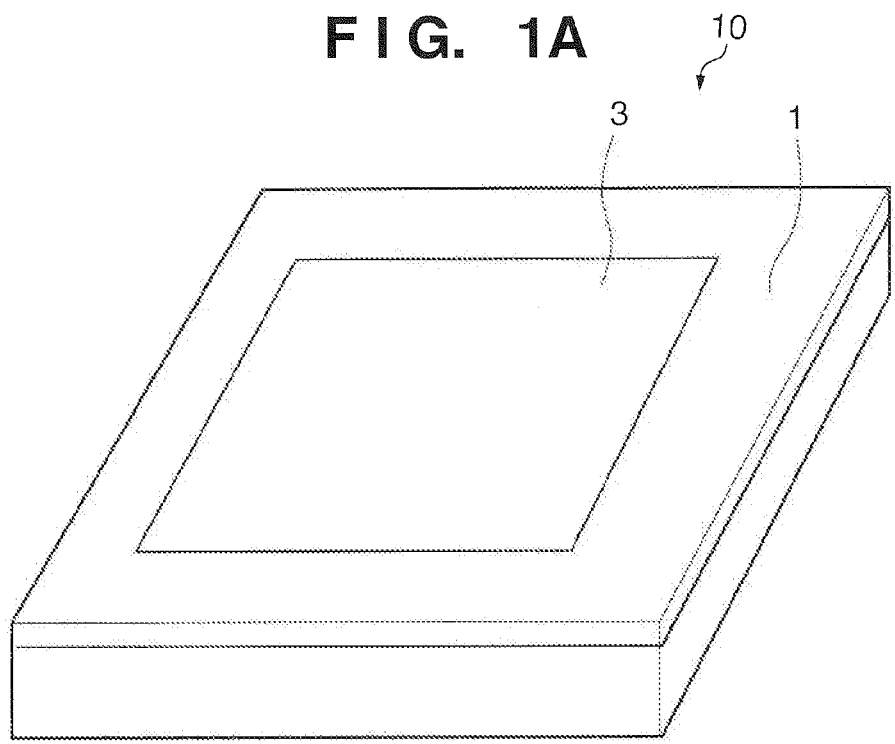
FIGS. 1A and 1B show an example configuration of an information processing apparatus according to an embodiment of the present invention.
Figure 1B:
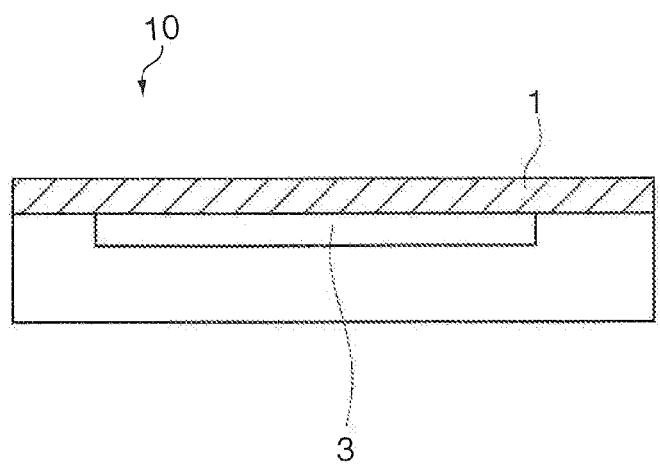

FIGS. 1A and 1B show an example configuration of an information processing apparatus according to an embodiment of the present invention. FIG. 1A is an external perspective view, and FIG. 1B is a cross-sectional view.

The information processing apparatus 10 includes a user interface in which a display apparatus 3 and a touch panel 1 are configured as a single body. The display apparatus 3 has a display panel, and displays various screens. The touch panel 1 functions as a coordinate input apparatus. The touch panel 1 is provided on a screen of the display apparatus 3, and inputs coordinates of an area of a finger or an instructing body that has been pressed against a coordinate input face into the apparatus.

Figure 2:
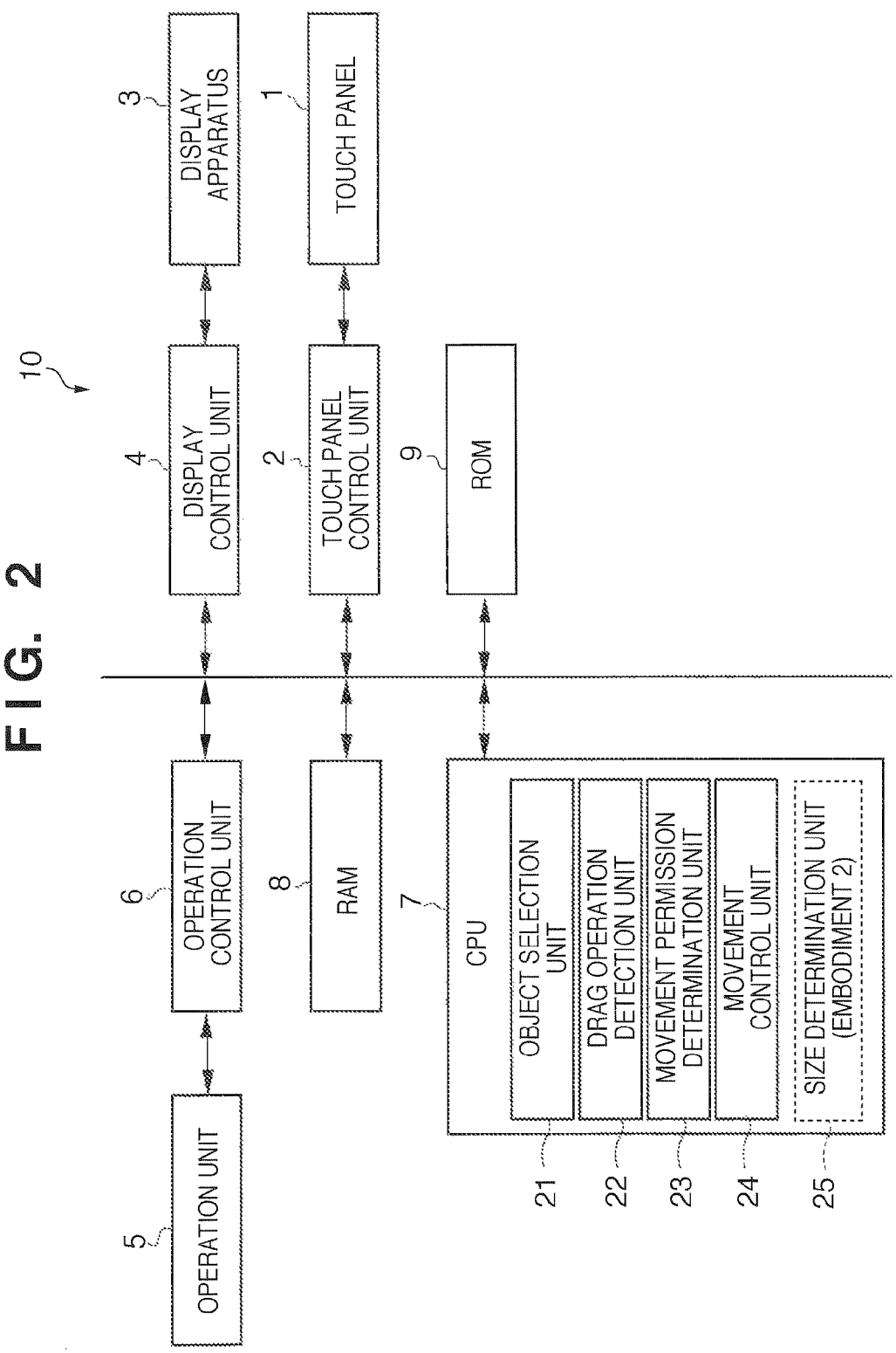
FIG. 2 shows an example functional configuration in an information processing apparatus 10 shown in FIGS. 1A and 1B.

FIG. 2 shows an example functional configuration in the information processing apparatus 10 shown in FIGS. 1A and 1B.

Here, the information processing apparatus 10 is configured with the touch panel 1, a touch panel control unit 2, the display apparatus 3, a display control unit 4, an operation unit 5, an operation control unit 6, a CPU 7, a RAM 8, and a ROM 9.

The touch panel control unit 2 controls the touch panel 1, and detects a position (referred to below as input coordinates) that has been pressed on the touch panel 1. That is, the touch panel control unit 2 functions as a coordinate detection unit that detects a coordinate position of a finger that makes an indication on a display screen.

The display control unit 4 causes various screens to be displayed on the display apparatus 3. For example, the display control unit 4 performs display control of a screen that includes an object that moves or the like on the display screen. The operation unit 5, for example, is composed of hard keys such as a numeric keypad and function buttons, and the operation control unit 6 inputs user instructions into the apparatus via the operation unit 5.

The ROM (Read Only Memory) 9 stores programs, various data, and so forth. The RAM (Random Access Memory) 8 is used as a work area for execution of programs by the CPU 7, and temporarily stores various computational results, coordinate data, and so forth.

Figure 3A:
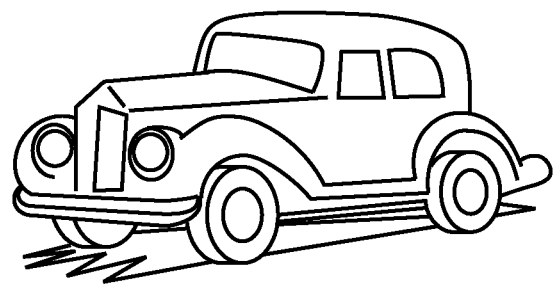
FIGS. 3A and 3B show an example of an object.
Figure 3B:
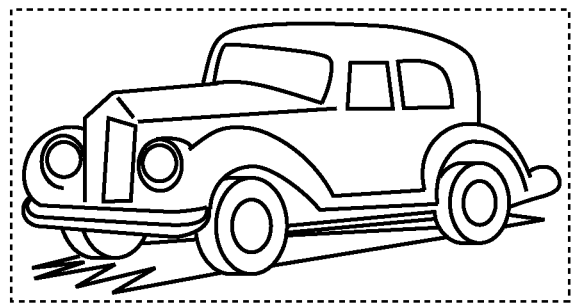

Here, an object (data) as shown in FIG. 3A is stored in the ROM 9. The object, for example, is bitmap data that moves on the display screen, and includes data that corresponds to an area indicated by a (rectangular) frame of dotted lines in FIG. 3B. One pixel of the bitmap data corresponds to one pixel of the display apparatus 3.

Here, a method for calculating the size of the object will be described. Here, for convenience of description, it is assumed that the size of the display apparatus 3 is 80 mm in the horizontal direction and 60 mm in the vertical direction, with the number of display pixels of the display apparatus 3 being 320 pixels in the horizontal direction and 240 pixels in the vertical direction. That is, the size is 0.25 mm per pixel. Here, for example, in the case of data having 80 pixels in the horizontal direction of the object and 40 pixels in the vertical direction of the object, the size of the object is a value obtained by multiplying the number of pixels in the vertical direction and the number of pixels in the horizontal direction respectively by 0.25. That is, the size of the object in this case is 20 mm in the horizontal direction and 10 mm in the vertical direction.

Next is a description of an example of a functional configuration realized by the CPU 7. The functions realized by the CPU 7 are, for example, realized by the CPU 7 executing a program stored in the ROM 9 or the like. Note that a size determination unit 25 will be described later.

The CPU 7 includes an object selection unit 21, a drag operation detection unit 22, a movement permission determination unit 23, a movement control unit 24, and the size determination unit 25.

The object selection unit 21 selects an object to be moved. Specifically, the object selection unit 21 selects an object displayed at a coordinate position on the display screen that corresponds to input coordinates instructed by the finger of the user as the object to be moved.

The drag operation detection unit 22 detects a drag operation of the object that has been selected by the object selection unit 21. This detection is performed based on input coordinates that have been detected by the touch panel 1 and the touch panel control unit 2.

When a drag operation of the object has been detected by the drag operation detection unit 22, the movement permission determination unit 23 determines whether or not to permit movement of the object following the drag operation. This determination is performed based on a following moving flag (flag=1 when moving is permitted, flag=0 when moving is prohibited).

While the drag operation is being detected, the movement control unit 24 controls movement of the object that was selected by the object selection unit 21. Control of movement of the object by the movement control unit 24 will be described later. In the above-described display control unit 4, display is performed by, for example, moving the object on the display screen based on instructions from the movement control unit 24. The foregoing is a description of the configuration of the information processing apparatus 10, but the configuration shown in FIGS. 1A and 1B and in FIG. 2 is only an example; appropriate modifications are possible.

Next, with reference to FIG. 4, is a description of an example summary of operation in the information processing apparatus 10 shown in FIGS. 1A and 1B, and FIG. 2.

S101 shows the object to be moved. Here, the size of the object is assumed to be 10 mm in the horizontal direction and 5 mm in the vertical direction. Ordinarily, this size is assumed to be hidden by the finger. The letter X denotes a center position of the object in the vertical direction, and the letter Z denotes a position (that is, input coordinates) that has been instructed by the finger.

S102 shows a state in which the object has been selected using the finger. The coordinate position of the object on the display screen is managed by the CPU 7, and in the state shown in S102, the inside of the area of the object has been touched by the finger. Here, in order to simplify description, it is assumed that the position X of the object is the same as the input coordinates Z input using the finger. As long as the input coordinates are within the area of the object, the object can be selected, so in many cases the center X of the object will be slightly offset from the input coordinates Z. This offset is not relevant to the present embodiment, so a description thereof is omitted here.

S103 shows the state of the object and the finger after the user drags the finger in the downward direction in the state of S102. The distance between the finger position (input coordinates) and the object position at this time is a difference "Z-X". If this difference "Z-X" is less than a distance a (first value), even if a drag operation is performed on the object, the object will not move following that operation. The distance a is the distance between the center position of the object and the input coordinates. Set in advance as the distance a, from experimental measurement or the like, is a value such that movement of the object is visible and not hidden by the finger (that is, not covered by the finger) when a drag operation of the object is performed by coordinate input using the finger. For example, the distance a is assumed to be about 20 mm.

S104 shows a state in which the user has further dragged the finger in the downward direction from the state in S103. In S104, the user's finger moves further downward than in S103, so the object gradually becomes visible. At this point in time as well, the difference "Z-X" between the finger position (input coordinates) and the object position has not reached the distance a, so still the object does not move.

S105 shows a state in which the user has further dragged the finger in the downward direction from the state in S104. In S105, the difference "Z-X" between the finger position (input coordinates) and the object position has reached the distance a. Afterward, when the difference "Z-X" exceeds the distance a, the object starts to move following movement of the finger. That is, when the finger moves in any direction, the object also moves to the extent that the finger moved. S106 and S107 show a state in which, while the difference of the distance between the finger position (input coordinates) and the object position is kept at distance a, the object is moving following the finger position (input coordinates).

Figure 5:
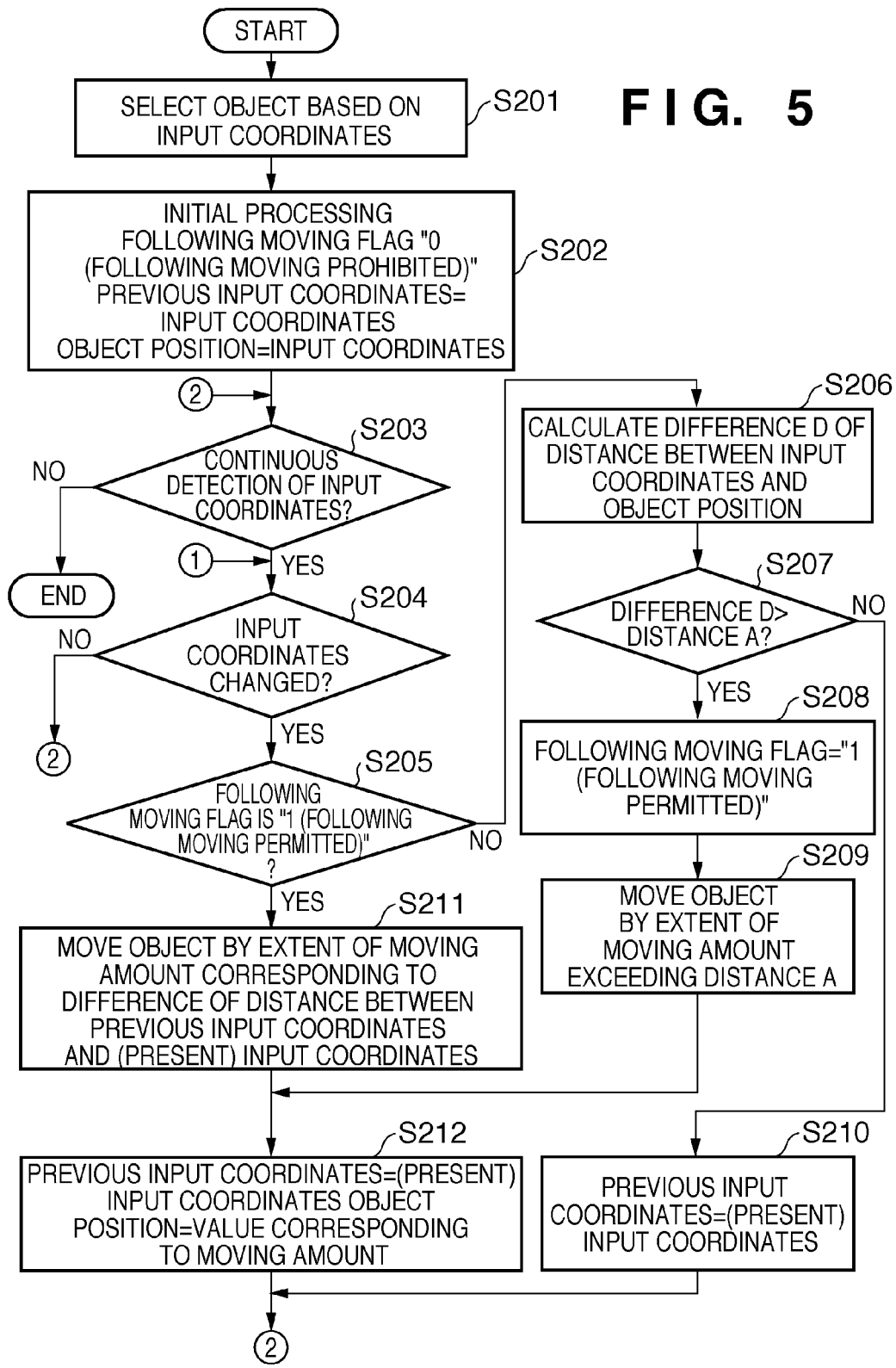
FIG. 5 is a flowchart that shows an example flow of processing in the information processing apparatus 10 shown in FIGS. 1A and 1B, and FIG. 2.

Here, with reference to FIG. 5, is a description of an example flow of processing in the information processing apparatus 10 shown in FIGS. 1A and 1B, and FIG. 2. Here, the processing from S102 onward (processing from object selection onward) in FIG. 4 will be described.

When this processing starts, the information processing apparatus 10, in the object selection unit 21, selects the object that corresponds to the input coordinates that have been instructed by the user using the finger (step S201), and performs initial processing (step S202). In the initial processing, a following moving flag is initialized to "0 (following moving prohibited)", and previous input coordinates $(X_0, Y_0)$ that were held in the RAM 8 are initialized with input coordinates $(X_1, Y_1)$. Also, the information processing apparatus 10 likewise initializes the coordinate position (x, y) of the object with the input coordinates $(X_1, Y_1)$. Note that although the object has a rectangular area, the center of that area is used as the object position.

Here, the information processing apparatus 10, in the drag operation detection unit 22, detects whether or not a drag operation has been performed for the object that was selected by the object selection unit 21. In this processing, first, a determination is made of whether or not input coordinates are being continuously detected. This determination is made depending on a detection pitch of the input coordinates to be detected by the touch panel 1 and the touch panel control unit 2. That is, detection and determination processing by the drag operation detection unit 22 are performed at each instance of a predetermined time interval.

If the result of the determination is that input coordinates are continuously detected (YES in step S203), detection of whether or not the values of the input coordinates are changing is performed. This detection is performed based on the input coordinates that have been detected by the touch panel 1 and the touch panel control unit 2. If input of coordinates is not continuously detected, that is, if there is non-contact of the finger (NO in step S203), this processing ends. At this time, the object stops at a position separated by the distance a from the position where there was non-contact of the user's finger (input coordinates).

On the other hand, if input coordinates are continuously detected (YES in step S203), but the input coordinate values have not changed (NO in step S204), a drag operation is not being performed, so the information processing apparatus 10 returns again to the processing in step S203, and continuously performs the same detection as described above.

If input coordinates are continuously detected (YES in step S203), and also the input coordinate values have changed (YES in step S204), that is, a drag operation is being performed, the information processing apparatus 10, in the movement permission determination unit 23, checks the following moving flag. That is, the information processing apparatus 10, in the movement permission determination unit 23, determines whether or not movement of the object following the drag operation is permissible.

If the result of the check is that the following moving flag is "0 (following moving prohibited)" (NO in step S205), the information processing apparatus 10, in the movement permission determination unit 23, calculates a difference d of the distance between the input coordinates and the object position (step S206). The method of calculating the difference d of distance is the same as vector calculation of a 2-dimensional coordinate system, so a description thereof is omitted here.

When the calculation of the difference d of distance finishes, the information processing apparatus 10, in the movement permission determination unit 23, compares the calculated difference d of distance to the above-described distance a. If the result of the comparison is that the difference d of distance is greater than the distance a (YES in step S207), the information processing apparatus 10, in the CPU 7, sets the following moving flag to "1 (following moving permitted)" (step S208). At this time, the information processing apparatus 10, in the movement control unit 24, instructs the display control unit 4 to move the object to the extent of the moving amount beyond the distance a. Thus, the display control unit 4 displays the object moved based on that instruction (step S209). The object moving amount can be calculated by calculating an intersection point (L, M) of a vector from previous input coordinates to present input coordinates with a circle having a radius with the object as its center (a radius of size corresponding to the distance a). Thus, the center of the new object is $(x+X_1-L, y+Y_1-M)$. Afterward, the information processing apparatus 10, in the CPU 7, updates the previous input coordinates with the present input coordinates, and updates the coordinate position (x, y) of the object corresponding to the moving amount in step S209 (step S212). Afterward, the information processing apparatus 10 returns again to the processing in step S203, and continuously performs the same detection as described above.

On the other hand, in the determination in step S207, if the difference d of distance is not greater than the distance a (NO in step S207), the information processing apparatus 10, in the CPU 7, updates the previous input coordinates with the present input coordinates (step S210), and again returns to the processing in step S203.

In the determination in step S205, if the following moving flag is "1 (following moving permitted)" (YES in step S205), the information processing apparatus 10, in the movement control unit 24, instructs the display control unit 4 to move the object to the extent of the moving amount corresponding to the difference between the previous input coordinates and the present input coordinates. Thus, the display control unit 4 displays the object moved based on the instruction (step S211). That is, the object is displayed moved to the extent of the finger moving amount. With this processing, first, a difference $(X_1-X_0, Y_1-Y_0)$ between the previous input coordinates and the present input coordinates is calculated, and the new position $(x+X_1-X_0, y+Y_1-Y_0)$ of the object is calculated. The object is moved based on the obtained values.

Afterward, the information processing apparatus 10, in the CPU 7, updates the previous input coordinates with the present input coordinates, and updates the coordinate position (x, y) of the object corresponding to the moving amount in step S211 (step S212). Afterward, the information processing apparatus 10 returns again to the processing of step S203, and continuously performs the same detection as described above.

Figure 6:
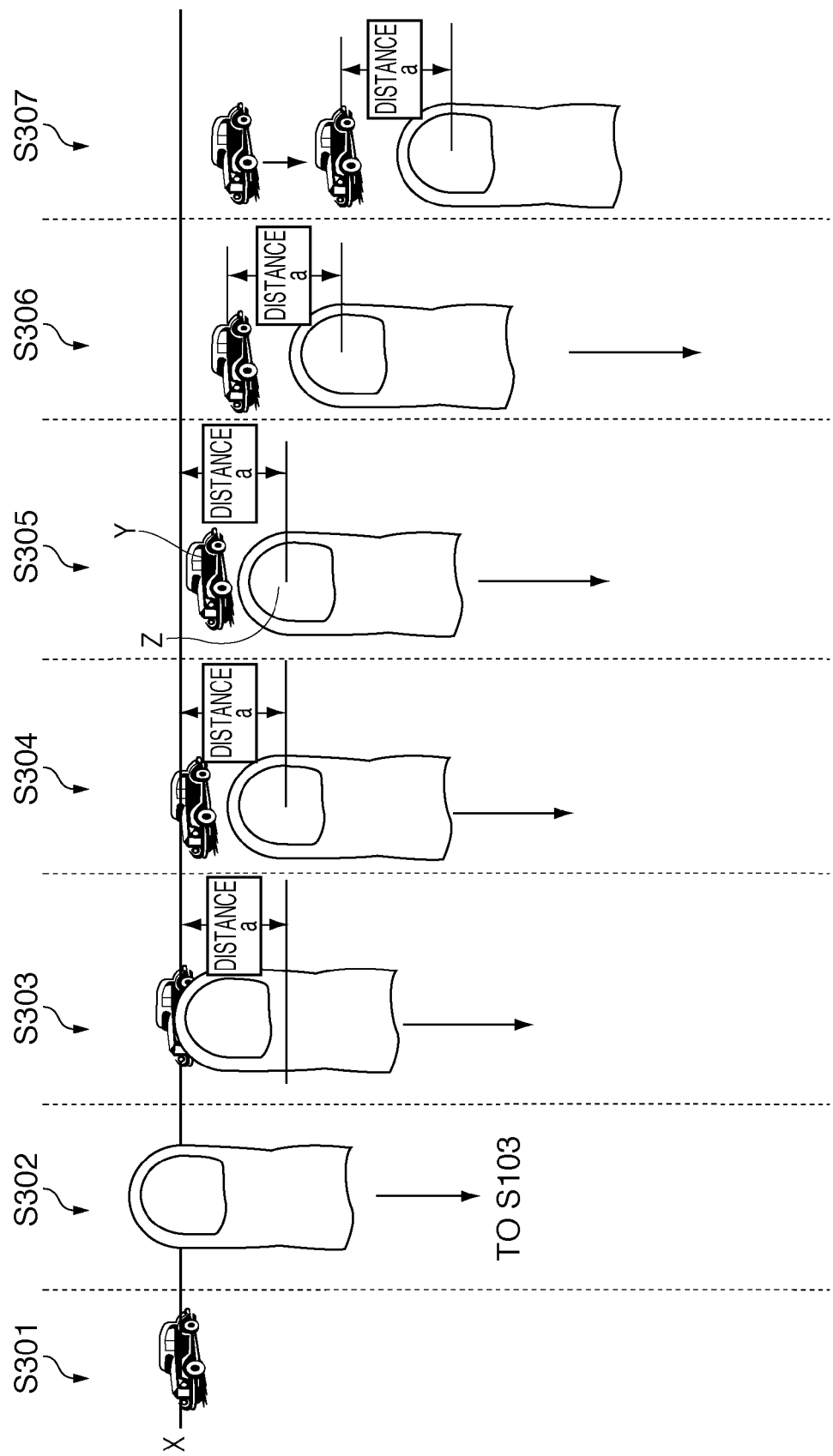
FIG. 6 shows an example summary of processing in the information processing apparatus 10 shown in FIGS. 1A and 1B, and FIG. 2.

In the above-described processing, object movement is prohibited until the difference between the finger position (input coordinates) and the object position reaches the distance a, but it is not necessary to perform control in this manner. For example, as shown in FIG. 6, a configuration may be adopted in which, based on the difference between the previous input coordinates and the present input coordinates, movement of the object is caused in a range that does not exceed that difference (in this case, one-third of the difference). Here, by way of example, movement in a range that does not exceed that difference is movement of one-third of the difference, but this is not a limitation. Any range that is less than the moving amount of the finger and is a certain fixed proportion may be adopted, for example one-half of the difference or one-quarter of the difference.

Thus either of the two movement methods is executed, specifically prohibiting object movement until the difference between the finger position (input coordinates) and the object position reaches the distance a, or causing movement by a moving amount that is less than the moving amount of the drag operation. Also, a configuration may be adopted in which a function is provided whereby either one of the above two movement methods can be executed, or a configuration may be adopted in which a function is provided whereby both of the two movement methods can be executed, and it is possible to switch between the movement methods. As a method for switching the movement method, for example, the method to be used to move the object may be set in advance according to a user instruction, or switching may be performed according to a user operation when moving the object.

Here, S302 shows an initial state in which the object has been selected by the user's finger, and in this case, X (the initial center position of the object), Y (the center position of the object), and Z (input coordinates) are at the same position. Here, in S303 to S305, the difference between the finger position (input coordinates) and the object position has not exceeded the distance a, and the object is moving downward following the user finger position (input coordinates). However, the object is moving in a range smaller than the finger moving amount. In S306, the difference Z-Y between the input coordinates and the object position has reached the distance a. Processing from this point onward is the same as in FIG. 4 described above.

Thus, the object moves while the distance between the finger position and the object position is kept at the distance a, and the object moves even in the initial stage of operation (the stage in which the distance a has not been exceeded). Therefore, even in the initial stage of operation to move the object, the object is selected as the movement target and moved, so the user can recognize that the object movement processing is being performed.

As described above, until the distance between the object and the finger (input coordinates) exceeds a certain distance (a first value), movement of the object is prohibited and the object moving amount is made smaller than the finger moving amount. Therefore, even when the size of the object to be moved is small and thus is unintentionally hidden by the finger, operability when moving the object improves. Thus, for example, moving of the object while the object is hidden under the finger is eliminated, so even if the size of the object is small, the user can precisely move the object to a desired position.

In the above description, it is assumed that the size of the object to be moved is such that the object is hidden by the finger, but following is a description of a case when the size of the object is comparatively large.

Figure 7:
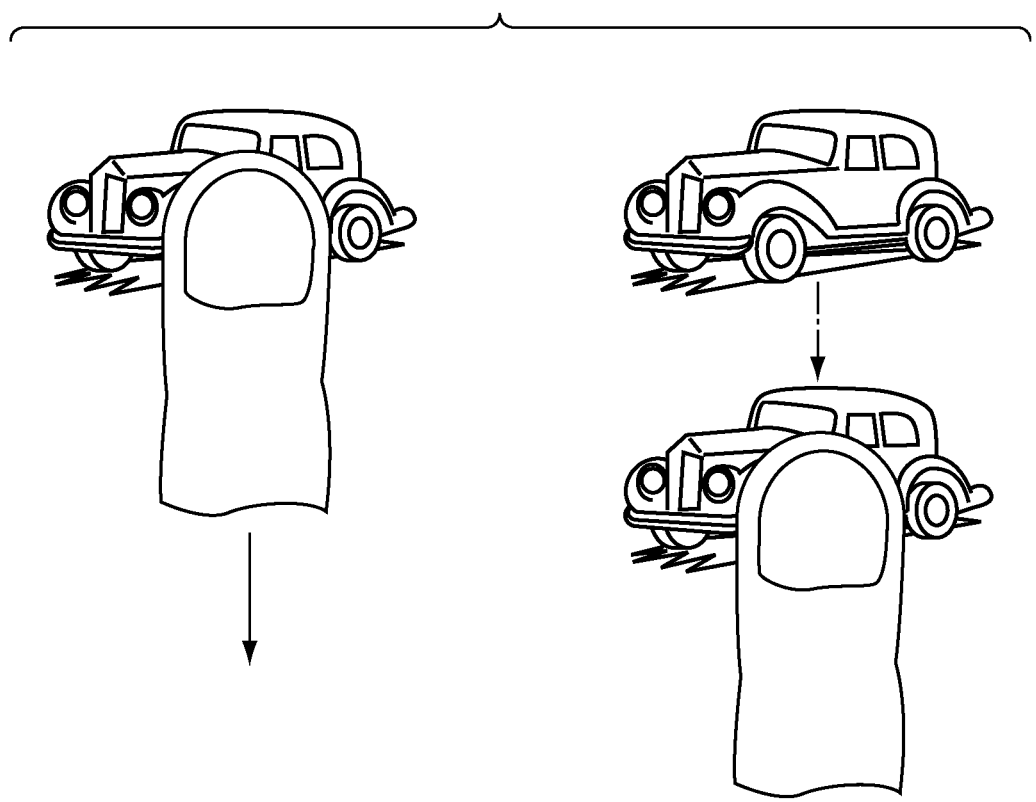
FIG. 7 shows an example of an object according to Embodiment 2.

An example object is shown in FIG. 7. Here, the size of the object is 25 mm in the horizontal direction and 12 mm in the vertical direction. That is, the object is assumed to have a size such that the object is not hidden by the user's finger. The size of the object shown in FIG. 7 ordinarily is larger than the size of the finger, so a configuration is adopted in which the control performed in S103 to S106 of FIG. 4 is not performed, and from the beginning the object is moved following the finger position to the extent that the finger moved.

Here, as shown in FIG. 2, in the configuration of the CPU 7, a size determination unit 25 is provided. The size determination unit 25 determines the size of the object that has been selected by the object selection unit 21. This determination is performed based on a second value that indicates a size corresponding to the horizontal width of the touching face of the finger on the touch panel 1, and a third value that indicates a size that corresponds to the vertical width.

Figure 8:
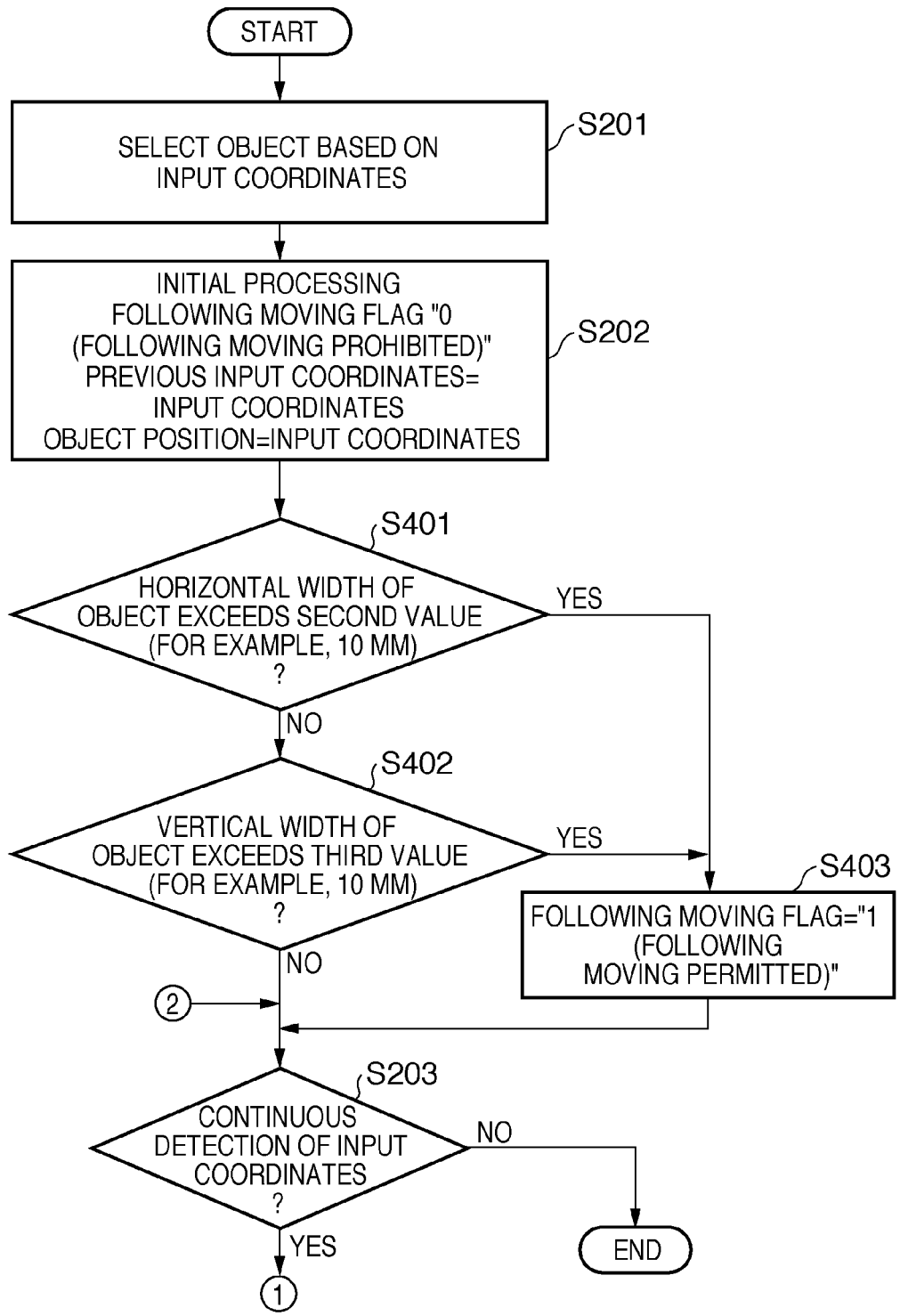
FIG. 8 is a flowchart that shows an example flow of processing in an information processing apparatus 10 according to Embodiment 2.

Next, with reference to FIG. 8, is a description of an example flow of processing in the information processing apparatus 10. The same reference numerals are assigned to the same processing as in above FIG. 5, and a repeated description thereof is omitted. Here, mainly points where the processing differs will be described. This processing differs in that after the initial processing has been performed in step S202, the processing indicated in steps S401 to S403 is performed until continuous detection of input coordinates is determined in step S203.

When object selection and initial processing finish (steps S201 and S202), the information processing apparatus 10, in the size determination unit 25, determines the size of the object that was selected in step S201. If the result of the determination is that the horizontal width of the object is greater than the second value (for example, 10 mm)(YES in step S401), the information processing apparatus 10, in the CPU 7, sets the following moving flag to "1 (following moving permitted)" (step S403). Thus, when the input coordinates have changed, the object is displayed moved following that change.

On the other hand, if the result of the determination is that the horizontal width of the object is not greater than the second value (NO in step S401), the information processing apparatus 10, in the size determination unit 25, determines whether or not the vertical width of the object is greater than the third value (for example, 10 mm). If the vertical width of the object is greater than the third value (YES in step S402), the information processing apparatus 10, in the CPU 7, sets the following moving flag to "1 (following moving permitted)" (step S403). Thus, when the input coordinates have changed, the object is displayed moved following that change. If the vertical width of the object is not greater than the third value (NO in step S402), the same processing as was described with reference to FIG. 5 is performed.

As described above, the size of the object is determined, and a judgment of whether or not the object will be hidden by the finger is made. When anticipated that the size of the object will be hidden by the finger, the same processing as was described with reference to FIG. 5 is performed, and when not anticipated that the size of the object will be hidden by the finger, the object is moved following movement of the finger. Thus, the movement method switches according to the results of determining whether or not the size of the object is such that the object will be hidden by the finger, so the object can be moved using an appropriate method.

Figure 9:
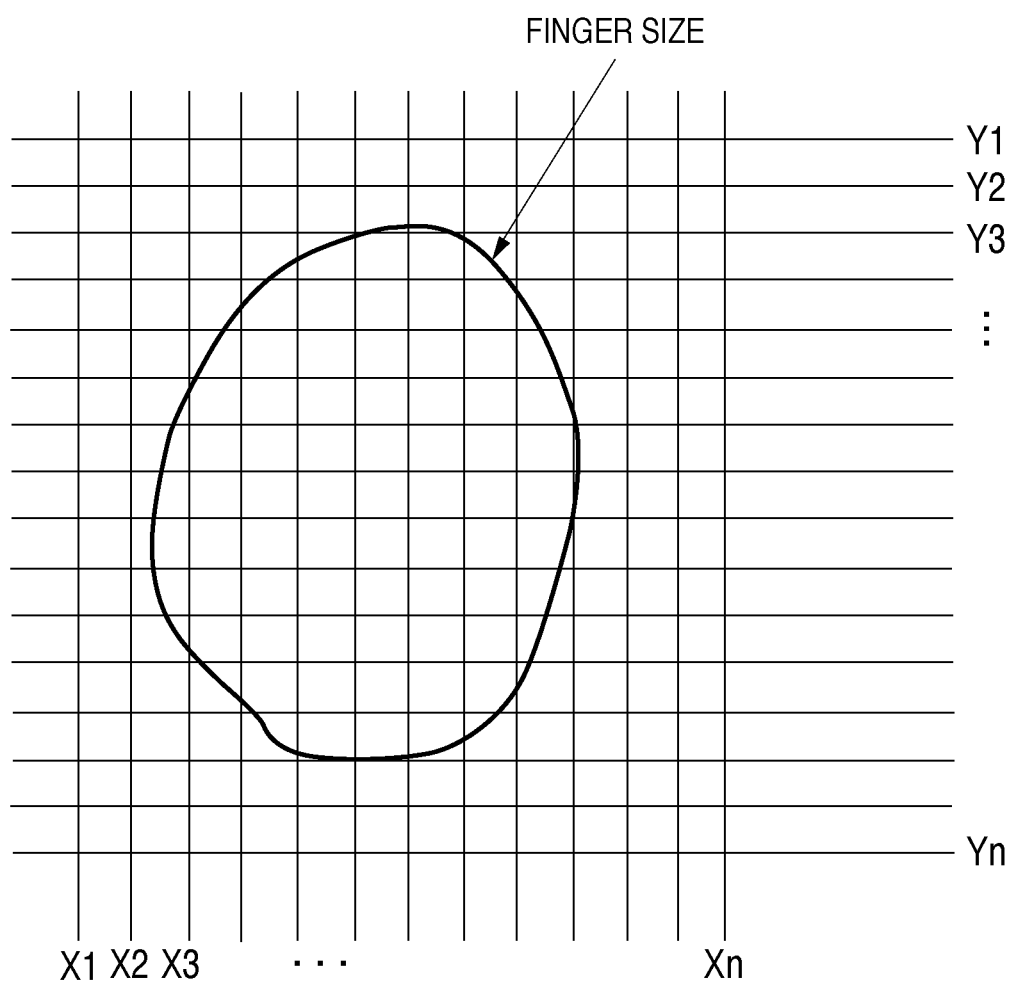
FIG. 9 shows an example of a modified embodiment.

Also, as described above, for the object size anticipated to be hidden by the finger, the size of the object was determined using fixed values (the second and third values), but this is not a limitation. For example, a configuration may also be adopted in which the size of the finger and the size of the object are compared to decide the second and third values. Here, a simple description is given of a method for detecting the size of the finger. For example, if a touch panel is configured using a resistance value detection method, that touch panel is configured with resistors disposed at predetermined intervals in the form of a matrix in the X and Y directions, as shown in FIG. 9. When an operator touches the touch panel 1, the intersection (for example, X1 and Y2) of resistors corresponding to the touched position is scanned. Thus, it is possible to know the input coordinates. In this case, if the matrix is configured with an interval smaller than the size of the finger, it is possible to determine the size of the finger in a simulated manner.

The foregoing is an example of a representative embodiment of the present invention, but the invention is not limited to the embodiment described above and shown in the drawings. The invention can be appropriately modified in a manner that does not change the gist of the invention.

For example, when neither of the horizontal width and the vertical width of the object exceeds the second value or the third value, if the area of the object has been instructed at the input coordinates, as shown in S501 to S503 in FIG. 10, a circumferential drawing may be displayed around the object. The center of this circle is the center of the object, and the above-described distance a, that is, the radius of the circle, is used as the distance at which object movement begins to follow finger movement. By this circumferential display, the user can visually identify how far the finger must move from the object in order for the object to move following the finger. Also, as shown in FIG. 10, the circumferential display may be continued or may be eliminated after the finger and the object are separated by the distance a.

Also, for example, as shown in FIG. 11, an object movable area 41 and a finger movable area 42 may be displayed in the display screen. When the movable areas of the object and the finger are the same, in a case of moving the object from the upper right corner to the lower left corner in FIG. 11, if the object is moved while keeping the distance between the object and the finger at the predetermined distance a, the object cannot be moved in a single drag operation.

Consequently, the finger movable area 42 (coordinate input face) is made larger than the object movable area 41 by at least the distance a on all sides. This may be realized by, as shown in the side view in FIG. 1B, making the touch panel 1 larger than the display apparatus 3 by at least the distance a on all sides. Also, when using an information processing apparatus in which the display apparatus 3 and the touch panel 1 are the same size, a configuration may be adopted in which a frame or the like is displayed in the display apparatus, the object movable area is limited, and the finger movable area and the object movable area can be changed. That is, the object movable area 41 is desirably smaller than the finger movable area 42 by at least the distance a (smaller by a predetermined distance) on all sides.

Above, an example embodiment was described in which the object stops at a position separated by the distance a from the position where non-contact of the user's finger (input coordinates) occurred, but this is not a limitation (step S203 in FIGS. 5 and 8). For example, when non-contact of the user's finger (input coordinates) has occurred, the object may be moved to the position where the user last touched in the drag operation. In this case as well, the object is separated from the finger by the distance a while the object is being moved by the drag operation, so operability for the user is not impaired.

Here, for example, the user can set in advance in operation settings whether (i) the object will be stopped at a position separated by the distance a, or (ii) the object will be moved to the position where non-contact of the finger occurred. For example, it is conceivable that a user desiring to finely adjust the position of the object wants to see the position of the object, and will therefore set (i). Also, for example, an operation of the user moving the object to a last designated position is more intuitive, and it is conceivable that a user preferring such an intuitive operation will set (ii).

Which of the operations of (i) and (ii) is caused to be performed may, for example, be switched according to whether or not an area is a predetermined area on the display screen. Here, for example, it is assumed that the object movable area and the finger movable area are the same size. In this case, when moving the object at an edge on the display screen, with the operation of (i), the object cannot be moved at that edge. Therefore, for example, for an area in the range of the distance a from an edge on the display screen, switching is performed such that operation is performed by the operation of (ii). Thus, even when the object movable area and the finger movable area are the same size, it is possible to move the object to an edge on the display screen. The predetermined area may be set by the user, or may be set in advance at the time of factory shipment or the like.

Also, which of the operations of (i) and (ii) is caused to be performed may, for example, be switched by a predetermined operation. For example, in a case when the finger has been removed after passage of a predetermined amount of time after a drag operation of an object, the operation of (i) is performed, and if that is not the case, the operation of (ii) is performed. Also, for example, the operation of (i) and (ii) may be switched by whether or not, after a drag operation of an object, the finger is removed and then that position is again touched by the finger. Also, for example, the operation of (i) and (ii) may be switched using a software key or a hardware key (for example, a button).

Also, in the embodiments described above, a case was described of inputting coordinates using a finger, but coordinates do not necessarily need to be input using a finger. For example, coordinate input may be performed using an instructing body (for example, such as a pen) that has a predetermined horizontal width and vertical width in the same manner as the finger. The same effects as described above are obtained in a case where, for example, the tip of the pin is thick and so the object is unintentionally hidden, or the like.

Also, in the embodiments described above, a case was described of inputting coordinates by touching a touch panel, but the method for inputting coordinates is not limited to this. For example, coordinates may be input by a method in which coordinates are input using a pointing device such as a mouse, and a drag operation is performed. The same effects as described above are obtained in a case where, for example, an object is unintentionally hidden by a cursor that indicates coordinates to be designated by the mouse.

Furthermore, in the embodiments described above, coordinates of an object that has been selected by the user and coordinates that the user has designated by performing a drag operation are obtained, and a determination is made of whether or not the distance between those coordinates exceeds a predetermined distance (distance a). However, the present invention is not limited to a configuration in which object coordinates are obtained. For example, in the above embodiments, the user performs the drag operation after designating the position where the object is being displayed. Therefore, a configuration may also be adopted in which a determination is made of the distance of the drag operation performed by the user after object selection, and the determined distance is adopted as the distance between the object position and the position that was designated by the drag operation.

Also, the present invention can be embodied as, for example, a system, an apparatus, a method, a program, a computer-readable storage medium, or the like. Specifically, the present invention may be applied to a system configured from a plurality of devices, or may be applied to an apparatus configured as a single device. For example, a configuration may be adopted in which the above-described processing is performed using an information processing apparatus incorporating a computer.

Furthermore, in the embodiments described above, a case was described of performing processing by a single CPU executing a program, but the present invention can also be realized in a case where processing is performed divided among a plurality of processors.

As described above, according to the present invention, operability when moving a small object using coordinate input can be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-004442 filed on Jan. 12, 2010, which is hereby incorporated by reference herein in its entirety.

What is claimed is:

1. An information processing apparatus, comprising:
an input unit configured to input coordinates in a display screen where an object is being displayed, according to an instruction by a user;
a selection unit configured to select the object being displayed in the display screen, corresponding to the input coordinates that were input by the input unit;
a detecting unit configured to detect a drag operation, based on the input coordinates that were input by the input unit, performed by the user in order to move the object that was selected by the selection unit,
a moving control unit configured to (i) control moving of the object, in a case where a drag distance between a first position of the coordinates corresponding to the selecting by the selection unit and a second position in the display screen that has been designated by the drag operation detected by the detecting unit does not exceed a first predetermined distance, such that a moving amount of the object is less than a moving amount of the drag operation or such that the object does not move, and (ii) control moving of the object, in a case where the drag distance exceeds the first predetermined distance, such that the object moves following the drag operation and a distance between the moving object and the second position in the display screen that has been designated by the drag operation is kept at a second predetermined distance, and
at least one processor configured to function as at least one of the input unit, the selection unit, the detecting unit, and the moving control unit.

2. The information processing apparatus according to claim 1, further comprising a determination unit configured to determine a distance in the display screen between a display position where the object is being displayed and the position that was designated by the drag operation, as the distance between the first position and the second position.

3. The information processing apparatus according to claim 2, wherein the moving control unit, in a case where the distance that was determined by the determination unit becomes the first predetermined distance, controls the moving of the object such that the distance between the position where the selected object is displayed and the position that has been designated by the user by the drag operation is kept at the first predetermined distance as the second predetermined distance.

4. The information processing apparatus according to claim 1, further comprising:
a size determination unit configured to determine the size of the object that was selected by the selection unit,
wherein the moving control unit, in a case where the size of the object that was determined by the size determination unit exceeds a predetermined size, even if the distance does not exceed the first predetermined distance, causes the selected object to move following the drag operation.

5. The information processing apparatus according to claim 3, wherein information that indicates the first predetermined distance from the object that was selected by the selection unit is displayed in the display screen.

6. The information processing apparatus according to claim 1, wherein in a case where a determination is made that the drag operation by the user is completed, the object that was moved by the moving control unit is displayed at a position in the display screen where the object was being displayed when the drag operation was completed.

7. The information processing apparatus according to claim 1, wherein in a case where a determination is made that the drag operation by the user is completed, the object that was moved by the moving control unit is displayed at a position in the display screen that was designated by the user when the drag operation was completed.

8. An information processing method, comprising:
inputting coordinates in a display screen where an object is being displayed according to an instruction by a user;
selecting the object being displayed in the display screen, corresponding to the input coordinates that were input in the input step;
detecting, based on the input coordinates that were input in the input step, a drag operation performed by the user in order to move the object that was selected in the selection step,
performing (i) moving control of the object, in a case where a drag distance between a first position of the coordinates corresponding to the selecting in the selecting step and a second position in the display screen that has been designated by the drag operation detected in the detecting step does not exceed a first predetermined distance, such that a moving amount of the object is less than a moving amount of the drag operation or such that the object does not move, and performing (ii) moving control of the object, in a case where the drag distance exceeds the first predetermined distance, such that the object moves following the drag operation and a distance between the moving object and the second position in the display screen that has been designated by the drag operation is kept at a second predetermined distance, and functioning at least one of the input unit, the selecting step, the detecting step, and the performing step by at least one processor.

9. A non-transitory computer-readable storage medium storing a computer program for causing a computer to execute the information processing method according to claim 8.

10. The information processing apparatus according to claim 1, wherein the display screen comprising a touch panel and the inputting unit inputs the coordinates corresponding to a touch position touched on the touch panel.

11. The method according to claim 8, further comprising determining a distance in the display screen between a display position where the object is being displayed and the position that was designated by the drag operation, as the distance between the first position and the second position.

12. The method according to claim 11, wherein the performing moving control of the object, in a case where the drag distance becomes the first predetermined distance, such that the distance between the position where the selected object is displayed and the position that has been designated by the user by the drag operation is kept at the first predetermined distance as the second predetermined distance.

13. The method according to claim 8, further comprising:
determining the size of the object that was selected in the selecting step,
wherein the performing, in a case where the size of the object that was determined in the size determining exceeds a predetermined size, even if the drag distance does not exceed the first predetermined distance, causes the selected object to move following the drag operation.

14. The method according to claim 12, wherein information that indicates the first predetermined distance from the selected object is displayed in the display screen.

15. The method according to claim 8, wherein in a case where a determination is made that the drag operation by the user is complete, the object that was moved in the performing is displayed at a position in the display screen where the object was being displayed when the drag operation was completed.

16. The method according to claim 8, wherein in a case where a determination is made that the drag operation by the user is completed, the object that was moved by the moving control unit is displayed at a position in the display screen that was designated by the user when the drag operation was completed.

17. The method according to claim 8, wherein the display screen comprising a touch panel and the inputting unit inputs the coordinates corresponding to a touch position touched on the touch panel.

* * * * *